(12) United States Patent
Hsu

(10) Patent No.: US 7,479,775 B2
(45) Date of Patent: Jan. 20, 2009

(54) NEGATIVE VOLTAGE GENERATOR

(75) Inventor: Jen Shou Hsu, Hsinchu (TW)

(73) Assignee: Etron Technology, Inc., Hsin Chu (TW)

( * ) Notice: Subject to any disclaimer, the term of this patent is extended or adjusted under 35 U.S.C. 154(b) by 191 days.

(21) Appl. No.: 11/488,139

(22) Filed: Jul. 18, 2006

(65) Prior Publication Data

US 2008/0018318 A1    Jan. 24, 2008

(51) Int. Cl.
    *G05F 3/16* (2006.01)
(52) U.S. Cl. .................. 323/317; 313/313; 313/316
(58) Field of Classification Search ............ 323/304, 323/311, 312, 313, 314, 315, 317; 327/530, 327/534, 535, 536, 538, 540; 365/185.23, 365/185.24, 226; 363/59, 60
See application file for complete search history.

(56) References Cited

U.S. PATENT DOCUMENTS 4,926,109 A * 5/1990 Koterasawa ............. 323/274
6,100,754 A * 8/2000 Kim et al. ................ 327/541
7,221,573 B2 * 5/2007 Kwean .................... 363/59
7,282,985 B2 * 10/2007 Yen et al. ................ 327/536

* cited by examiner

*Primary Examiner*—Gary L Laxton
(74) *Attorney, Agent, or Firm*—Muncy, Geissler, Olds & Lowe PLLC

(57) ABSTRACT

A negative voltage generator includes a current mirror unit, a control unit, a resistor, and a switching unit. The current mirror unit receives a first positive voltage from a first positive voltage source and a second positive voltage from a second positive voltage source and determines how to generate a first output current and a second output current according to the difference of a received positive reference voltage and the second positive voltage. The control unit generates a control signal whose value depends on the voltage variation of a negative voltage generated by a negative voltage source, and the on/off state of the switching unit is determined according to the control signal to keep the current passing through the switching unit constant and to generate a first output negative voltage having a constant level.

24 Claims, 12 Drawing Sheets

NEGATIVE VOLTAGE GENERATOR

BACKGROUND OF THE INVENTION (a) Field of the Invention

The invention relates to a negative voltage generator, particularly to a negative voltage generator capable of generating stable negative voltage.

(b) Description of the Related Art

In typical memory architecture, different negative voltage levels generated by charge pump circuits of negative voltage generators are provided for specific components of a memory, such as word lines in a memory array.

FIG. 1A shows a schematic diagram illustrating a conventional negative voltage generator 10. The negative voltage generator 10 includes a level detector 11, a ring oscillator 12, and a charge pump 13. The level detector 11 includes an operational amplifier OP1, two resistors R1 and R2, a PMOS transistor MP1, a NMOS transistor MN1, and two inverters Inv1 and Inv2. In the negative voltage generator 10, the charge pump 13 generates a negative voltage VBB, and the possible variation of the negative voltage VBB is detected by the level detector 11. The detection result serves as a basis to generate a control signal envbb, which is then fed to the ring oscillator 12 and the charge pump 13 to accurately keep the negative voltage VBB maintained at its pre-set level.

The operations of the negative voltage generator 10 are described below. Referring again to FIG. 1A, herein assume R1=10KΩ, R2=30KΩ, regulated voltage VCC=1.2V, pre-set negative voltage VBB=−0.6V and reference voltage refvbb=0.75V, and the gate of the NMOS transistor MN1 is biased so that MN1 can be regarded as a current source load.
[0005] In case the negative voltage VBB output from the charge pump 13 varies from −0.6V to −0.65V, the voltage Vn1 at node n1 equals 0.7375 v since the resistance value of the resistor R2 is three times that of the resistor R1. Then, the operational amplifier OP1 compares the reference voltage refvbb and the voltage Vn1 at node n1 and outputs a voltage signal having high level voltage, for the reference voltage refvbb (=0.75V) is higher than the voltage Vn1 (=0.7375V). In that case, the PMOS transistor MP1 is turned off. Hence, the voltage at node n2 becomes low level voltage to thus generate a drive signal envbb having low level 0. The drive signal envbb is transmitted into the ring oscillator 12 and further to the charge pump 13 via two inverters Inv1 and Inv2 to disable the charge pump 13. On the contrary, in case the negative voltage VBB varies from −0.6V to a more positive level such as −0.5V, the level detector 11 will generate a drive signal envbb having high level 1 to enable the charge pump 13, so that the output negative voltage VBB is pumped from −0.5V to the pre-set voltage −0.6V. Thus, according to such balance mechanism, the negative voltage VBB generated by the charge pump 13 is maintained at a fixed level.

However, during operation, the conventional negative voltage generator 10 often encounters problems as described below.

First, the sensibility of a typical level detector 11 is often unsatisfactory when it measures the output negative voltage VBB. For example, when the negative voltage VBB varies from −0.6V to −0.65V with a voltage variation Δvbb of 0.05V (=|−0.6−(−0.65)|), the voltage Vn1 at node n1 will vary from 0.75V to 0.7375V with the a voltage variation of 0.0125V (¼*Δvbb). Hence, the measurement of a typical level detector 11 only reflects one-fourth of the negative voltage variation Δvbb, and this result causes an inferior sensibility in the traditional negative voltage generators.

Second, in the conventional negative voltage generator 10, the complex adjustment procedure for regulating the negative voltage VBB may cause a significant time delay. The adjustment procedure may include at least the following steps:

1. The negative voltage VBB reflecting at node n1 is measured and then compared with the reference voltage refvbb by means of an operational amplifier OP1;

2. A drive signal envbb having a high level 1 or low level 0 is generated, and the drive signal envbb is transmitted to the ring oscillator 12 and the charge pump 13; and 3. The charge pump 13 adjusts the level of the negative voltage VBB according to an oscillation signal output from the ring oscillator 12 and the drive signal envbb.

Hence, the above complicated loop for signal transmission results in an obvious delay in signal response.

To sum up, the defects of the conventional design described above may eventually cause a voltage ripple to make the output negative voltage VBB unstable and fail to be maintained at a fixed value. FIG. 1B shows a waveform diagram to illustrate the operations of the conventional negative voltage generator 10, where the notation "envbb" indicates a drive signal transmitted from inverters Inv1 and Inv2, the notation "Ivbb" indicates a drive current generated by the charge pump 13 according to the drive signal envbb, the notation "VBB" indicates an actual negative voltage with a ripple, and the notation "VBBt" indicates an ideal target negative voltage. After receiving the drive signal envbb having high level 1, the charge pump 13 digitally adjusts the level of the negative voltage VBB according to the drive current Ivbb. From FIG. 1B, it is clearly seen a stable output waveform of the negative voltage VBB is not achieved due to the formation of the voltage ripple. The voltage ripple, often with amplitude of tens of millivolts, seldom influences the memory design in the past since its required negatives voltage often ranges from about −1V to −1.5V. However, the voltage ripple really influences nowadays memory design that pursues high accuracy and requires only hundreds of millivolts of negatives voltage.

Besides, in nowadays memory design, different levels of the negative voltage for a single memory array are often needed. However, according to the conventional design, each distinct voltage level requires a separate charge pump to generate. For example, as shown in FIG. 1C, three different levels of the negative voltage, such as −0.2V, −0.3V and −0.6V required three different charge pump 13, 13' and 13" to generate. Hence, the layout areas and fabrication costs of the circuit are both considerable.

BRIEF SUMMARY OF THE INVENTION

Hence, an object of the invention is to provide a negative voltage generator capable of providing a stable output negative voltage.

According to the invention, a negative voltage generator includes a resistance device, a constant current source, and negative voltage down converter. The resistance device is disposed between a second voltage source and a predetermined negative reference voltage. The constant current source generates a constant current flowing through the resistance device, wherein a first output negative voltage is generated at one end of the resistance device and the level of the first output negative voltage is independent of the variation of the predetermined negative reference voltage. The negative voltage down converter receives the first output negative voltage and generating a second output negative voltage at a second output node.

Furthermore, another subject of the invention provides a negative voltage generator which includes a first current mirror unit, a second current mirror unit, and a negative voltage down converter.

The first current mirror unit receives a fist positive voltage from a first positive voltage source and a second positive voltage from a second positive voltage source. The first current mirror unit determines how to generate a first output current and a second output current according to a received positive reference voltage and the second positive voltage, wherein the values of the first output current and the second output current are proportional.

The second current mirror unit includes a control unit, a first resistor, and a switching unit. The control unit receives the second output current and generates a control signal whose value depends on the voltage variation of a negative voltage generated by a negative voltage source. The first resistor is connected between the second positive voltage source and a first output node. The switching unit is connected between the first output node and the negative voltage source. The on/off state of the switching unit is determined according to the control signal to keep the current passing through the switching unit fixed and to generate a first output negative voltage having a constant level through the first output node.

The negative voltage down converter receives the first output negative voltage and generates a second output negative voltage through a second output node. Further, the negative voltage down converter adjusts the second output negative voltage according to the first output negative voltage, so that a stable second output negative voltage is obtained.

Through the design of the invention, the control unit generates a control signal whose value depends on the negative voltage variation due to a ripple to track the negative voltage generated by charge pump, and thus the switching unit may keep the current passing through the switching unit constant according to the control signal and generate a stable output negative voltage as a result. Further, the negative voltage down converter is incorporated in the voltage mirror circuit to drive a high power device, and it is also able to avoid an unstable output negative voltage.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

Figure 1A:
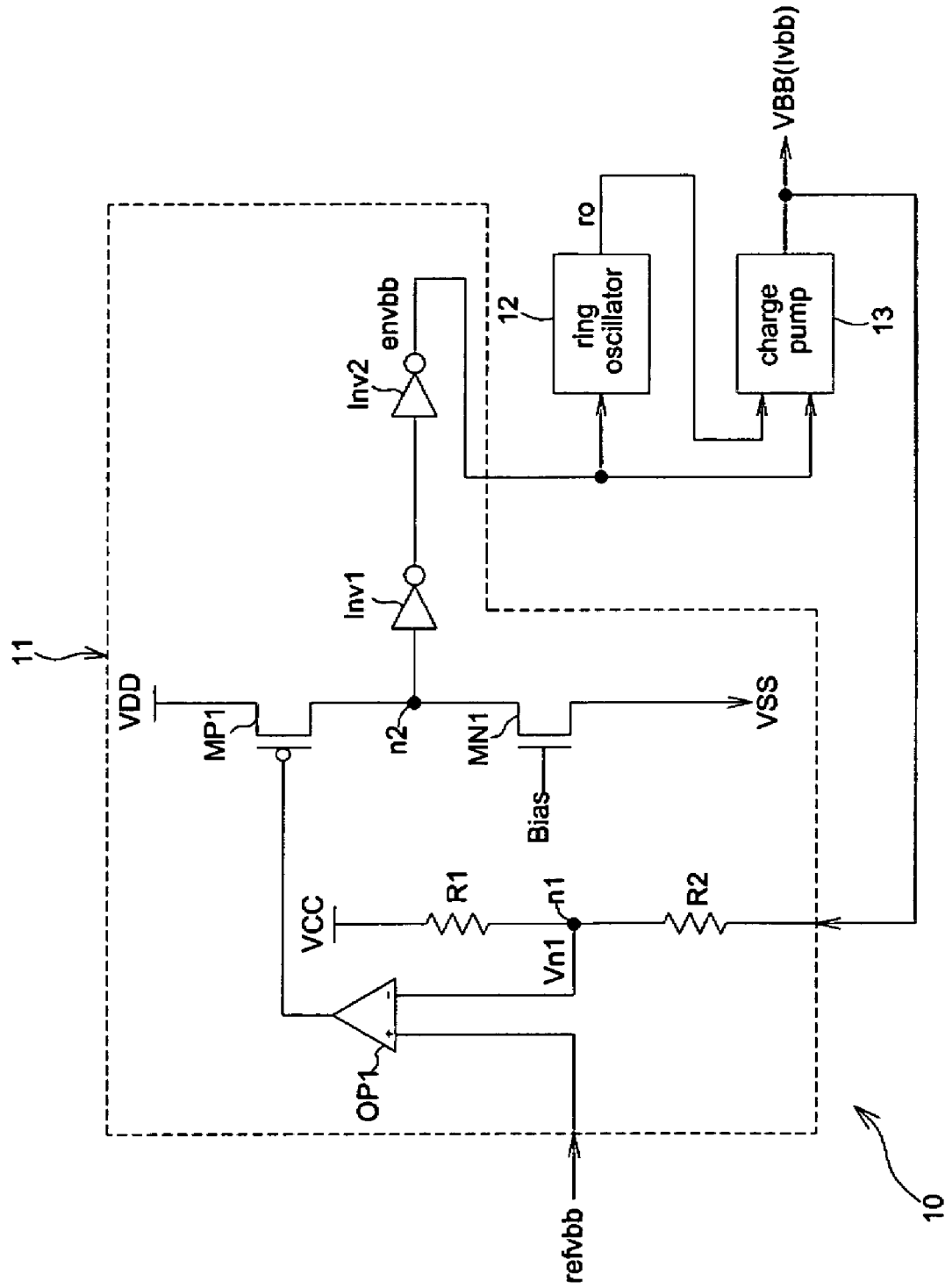
FIG. 1A shows a schematic diagram illustrating a conventional negative voltage generator.
Figure 1B:
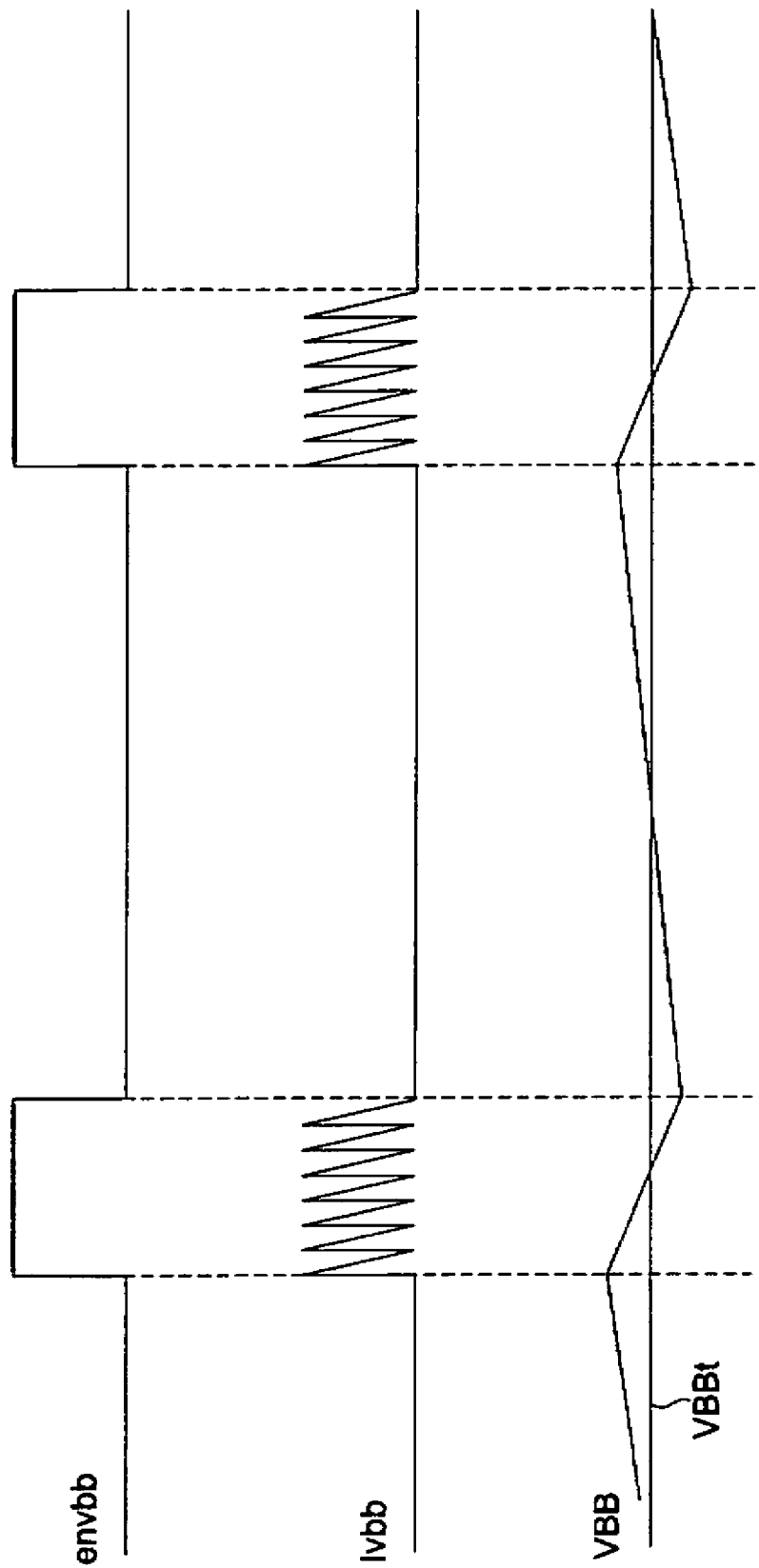
FIG. 1B shows a waveform diagram illustrating the operations of the conventional negative voltage generator shown in FIG. 1A.
Figure 1C:
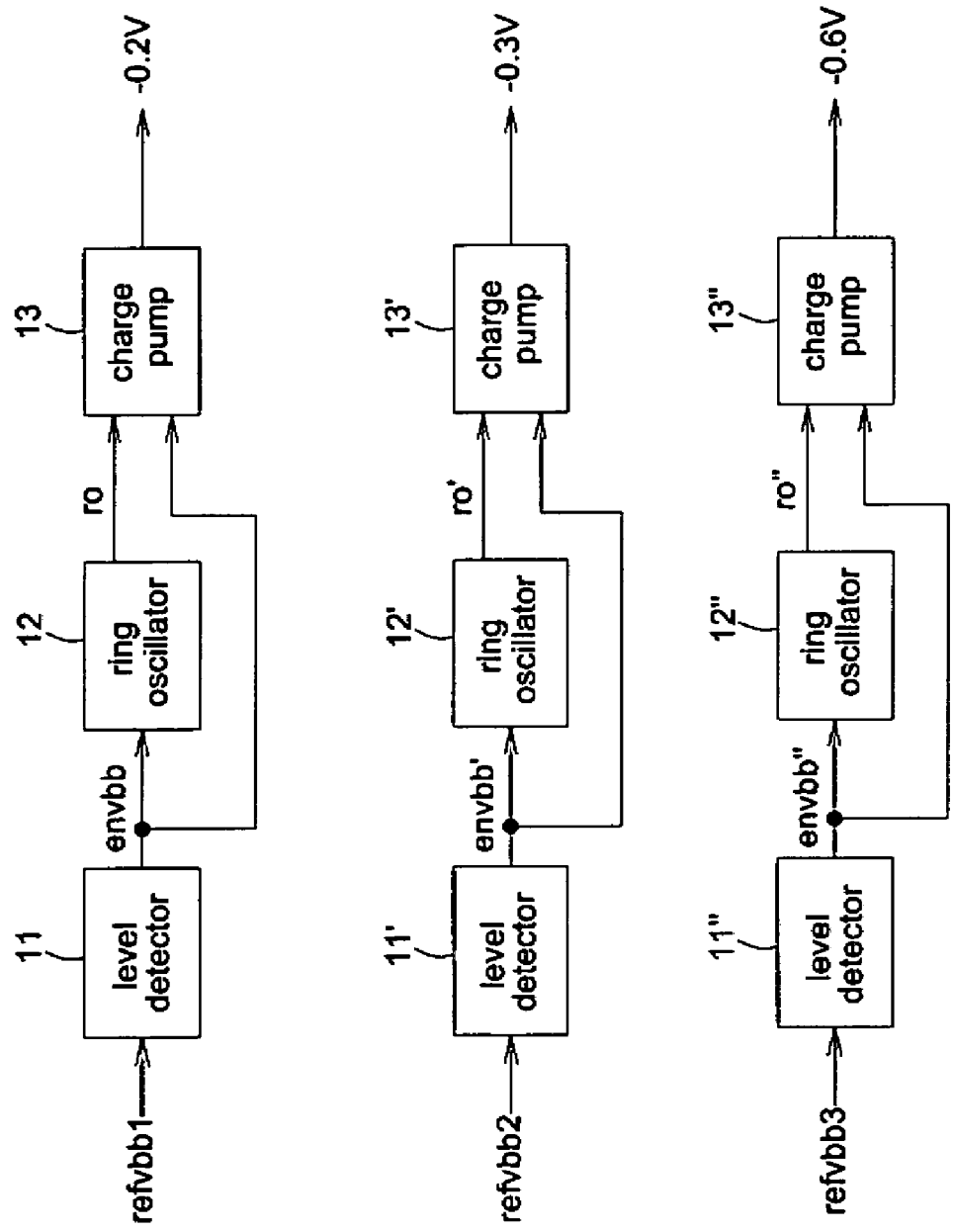
FIG. 1C shows a schematic diagram illustrating a conventional design for the generation of three different levels of negative voltage.
Figure 2A:
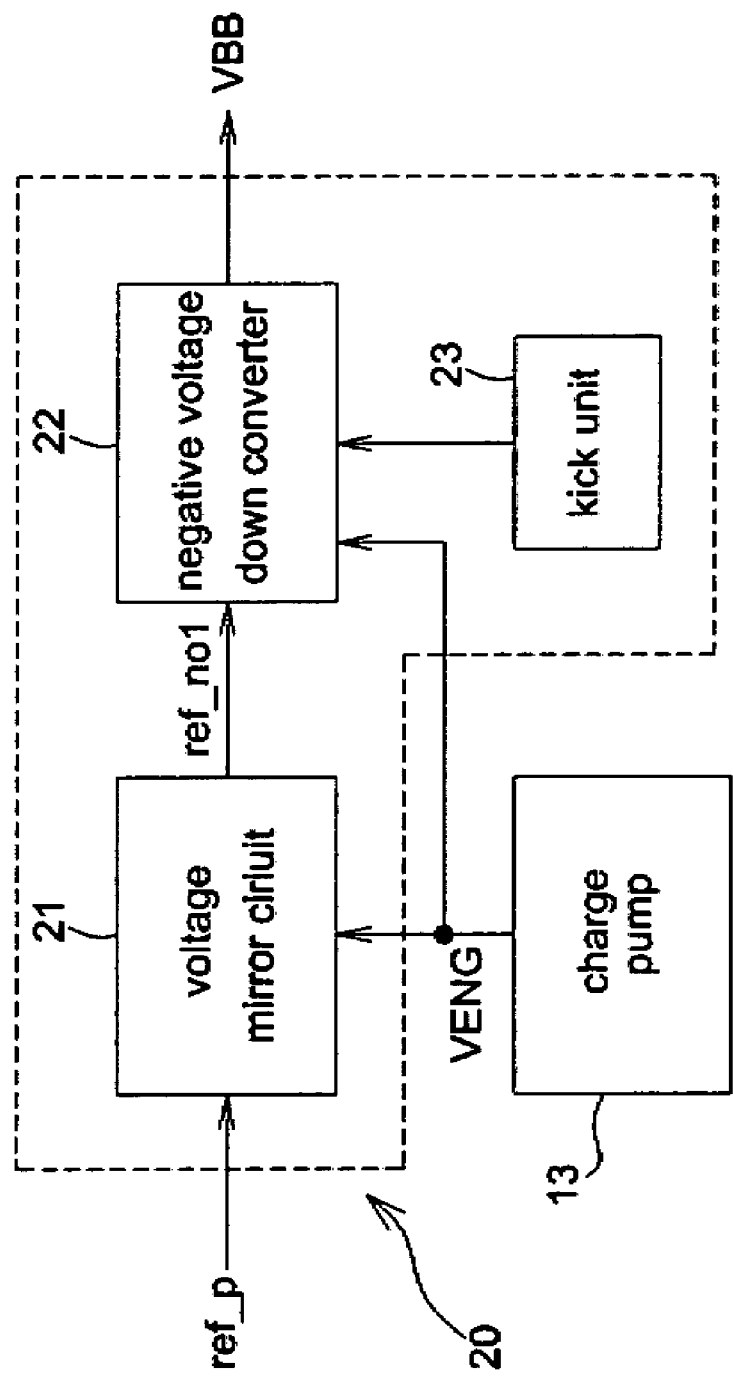
FIG. 2A shows a schematic diagram illustrating a negative voltage generator according to an embodiment of the invention.

Referring to FIG. 2A, a negative voltage generator 20 of the invention includes a voltage mirror circuit 21, a negative voltage down converter 22, and a kick unit 23. The negative voltage generator 20 receives a source negative voltage VENG generated by a charge pump 13 and generates a stable output negative voltage VBB according to a positive reference voltage ref_p.

Figure 2B:
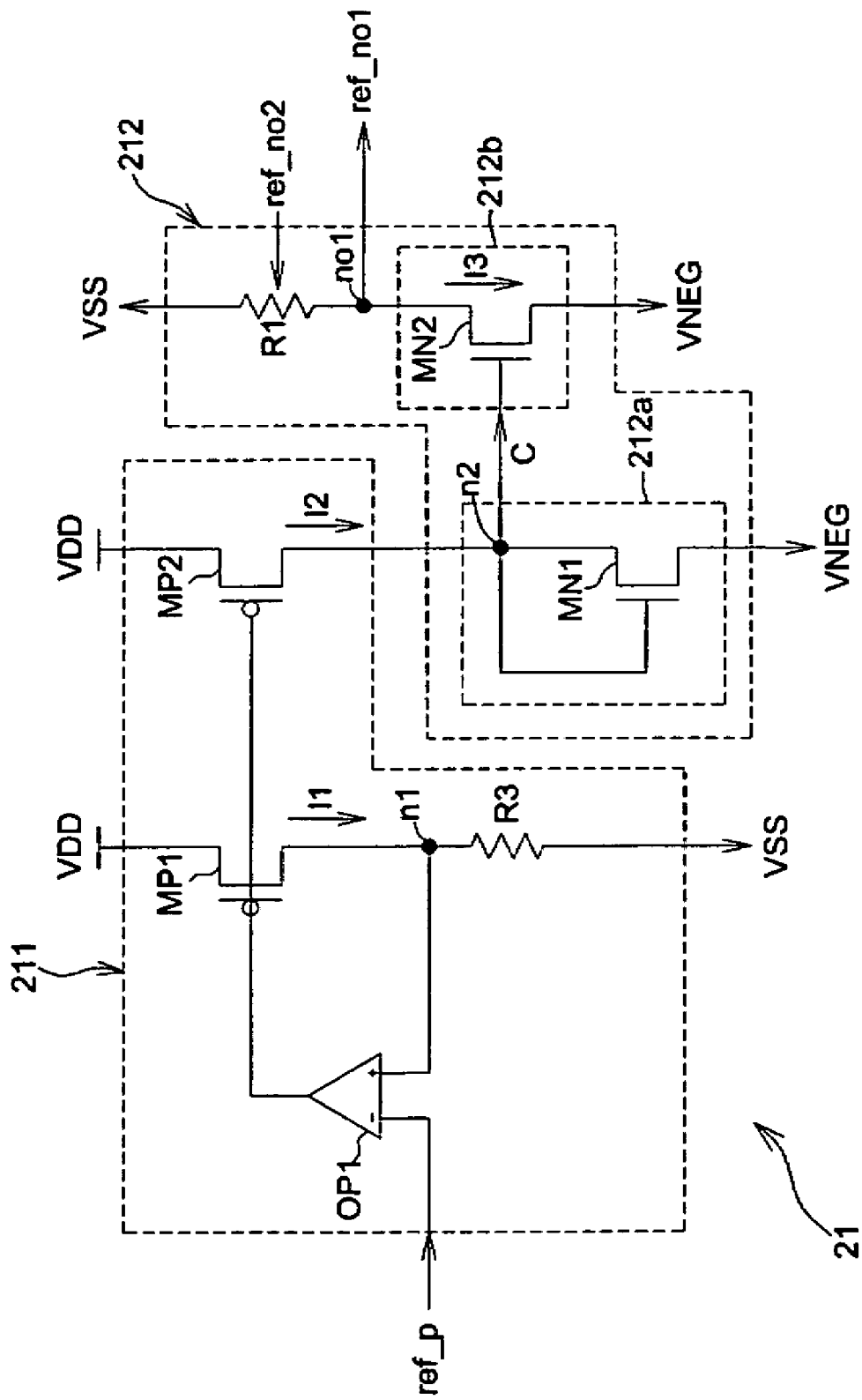
FIG. 2B shows a schematic diagram illustrating a voltage mirror circuit according to the invention.

Referring to FIG. 2B, the voltage mirror circuit 21 receives the source negative voltage VENG generated by the charge pump 13 and generates a stable and fixed first output negative voltage ref_no1 according to the positive reference voltage ref_p. Alternatively, different levels of the negative voltage ref_no2 can be obtained by providing a tap on the resistor R1 shown in FIG. 2B.

The voltage mirror circuit 21 includes a first current mirror unit 211 and a second current mirror unit 212. The first current mirror unit 211 receives a fist positive voltage (high voltage level) from a first positive voltage source VDD and a second positive voltage source VSS (ground voltage level or other stable positive voltage level). Then, the first current mirror unit 211 determines how to generate a first output current I1 and a second output current I2 according to the positive reference voltage ref_p and the second positive voltage source VSS, where the values of the first output current I1 and the second output current I2 are equal if $$\left(\frac{W}{L}\right)_{MP1} = \left(\frac{W}{L}\right)_{MP2}.$$

The first current mirror unit 211 may be constructed by the current mirror circuit shown in FIG. 2B or other circuit having similar functions. Referring to FIG. 2B, the first current mirror unit 211 includes an operational amplifier OP1, a first PMOS transistor MP1, a resistor R3, and a second PMOS transistor MP2.

The positive reference voltage ref_p is fed into the operational amplifier OP1 via its inverted input port. The gate of the first PMOS transistor MP1 is connected to the output port of the operational amplifier OP1, its source is connected to the positive voltage source VDD, and its drain is connected to the non-inverted input port of the operational amplifier OP1 to generate the first output current I1. A first node n1 is formed by the junction of the drain of the first PMOS transistor MP1 and the non-inverted input port of the operational amplifier OP1. The resistor R3 is connected between the first node n1 and the second positive voltage source VSS. Further, the gate of the second PMOS transistor MP2 is connected to the output port of the operational amplifier OP1, its source is connected to the positive voltage source VDD. The second output current I2 flows through the drain of the second PMOS transistor MP2. Wherein, the first output current I1 and the second output current I2 are given by the following equations:

$$I1 = \frac{V_{\text{ref\_p}}}{R3} \quad (1.1)$$

$$I2 = \frac{\left(\frac{W}{L}\right)_{MP2}}{\left(\frac{W}{L}\right)_{MP1}} \times I1 = \frac{\left(\frac{W}{L}\right)_{MP2}}{\left(\frac{W}{L}\right)_{MP1}} \times \frac{V_{\text{ref\_p}}}{R3} \quad (1.2)$$

The second current mirror unit 212 includes a control unit 212a, a resistor R1, and a switching unit 212b. The control unit 212a receives the second output current I2 and generates a control signal C whose value depends on the voltage variation of the source negative voltage VENG generated by the charge pump 13. The control unit 212a may be constructed by the circuit shown in FIG. 2B or other circuit having similar functions. As shown in FIG. 2B, the control unit 212a includes a first NMOS transistor MN1. The drain and the gate of the first NMOS transistor MN1 are connected with each other at a second node n2. The source of the first NMOS transistor MN1 is connected to the source negative voltage VENG, and the first NMOS transistor MN1 receives the second output current I2 via its drain. The control signal C is generated by the first NMOS transistor MN1 through the second node n2.

The resistor R1 is connected between the second positive voltage source VSS and a first output node no1. The switching unit 212b is connected between the first output node no1 and the negative voltage source VENG, and its on/off state is determined according to the control signal C generated by the control unit 212a, so that the third output current I3 passing through the switching unit 212b is kept constant. A first output negative voltage ref_no1 having a constant level is generated through the first output node no1. Certainly, different levels of the negative voltage ref_no2 can be obtained by providing a tap on the resistor R1. Wherein, the third output current I3 and first output negative voltage ref_no1 are given by the following equations:

$$I3 = \frac{\left(\frac{W}{L}\right)_{MN2}}{\left(\frac{W}{L}\right)_{MN1}} \times I2 = \frac{\left(\frac{W}{L}\right)_{MN2}}{\left(\frac{W}{L}\right)_{MN1}} \times \frac{\left(\frac{W}{L}\right)_{MP2}}{\left(\frac{W}{L}\right)_{MP1}} \times \frac{V_{\text{ref\_p}}}{R3} \quad (1.3)$$

$$V_{\text{ref\_no1}} = -I3 \times R1 = -\frac{\left(\frac{W}{L}\right)_{MN2}}{\left(\frac{W}{L}\right)_{MN1}} \times \frac{\left(\frac{W}{L}\right)_{MP2}}{\left(\frac{W}{L}\right)_{MP1}} \times \frac{V_{\text{ref\_p}}}{R3} \times R1 \quad (1.4)$$

The reason why the first output negative voltage ref_no1 or ref_no2 can be stabilized is described below.

Figure 2C:
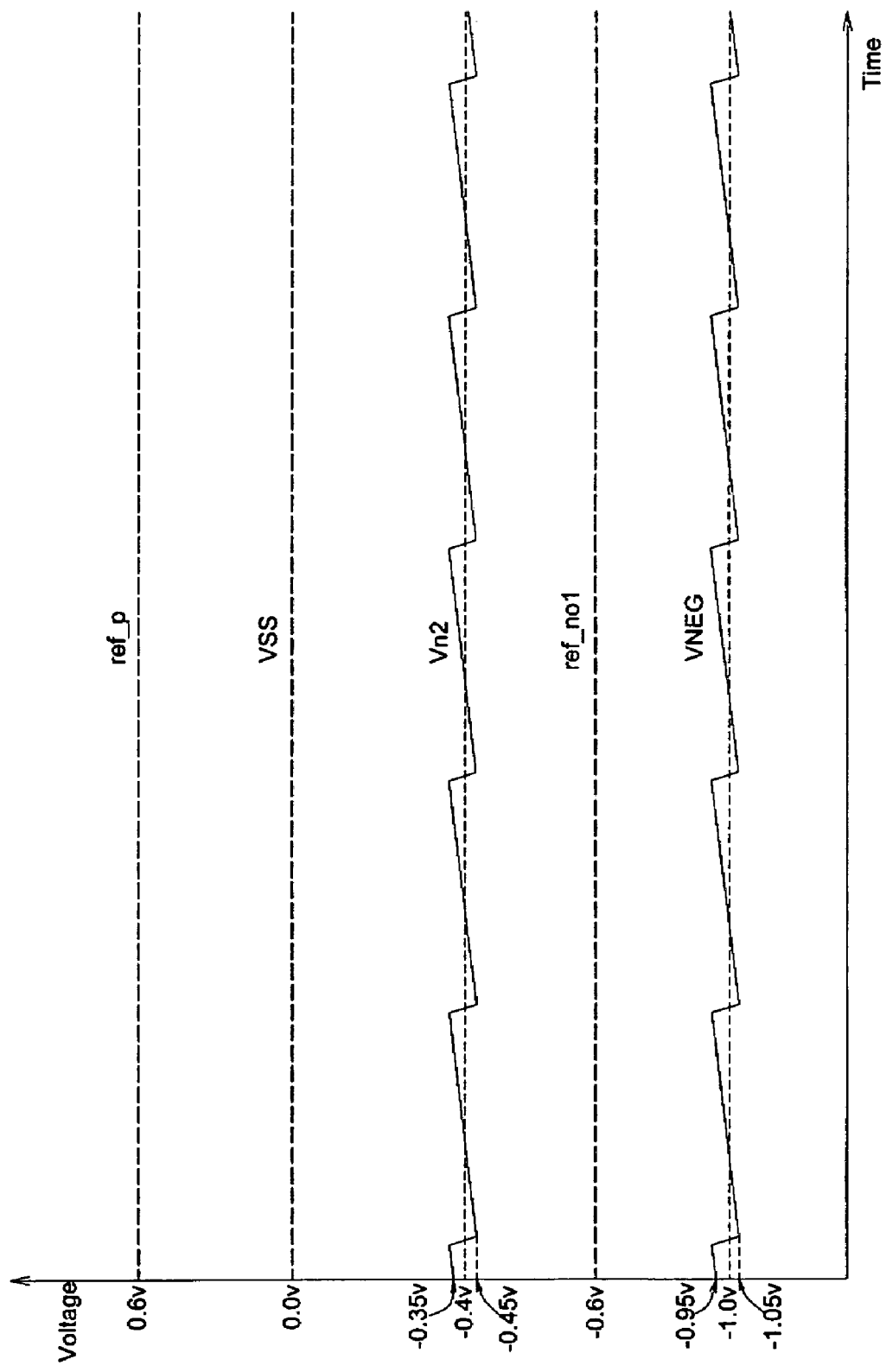
FIG. 2C shows a waveform diagram illustrating the operations of the voltage mirror circuit shown in FIG. 2B.

Referring to FIG. 2B and 2C, as one of the embodiment, the positive reference voltage ref_p is 0.6V received from a band gap reference circuit, the first positive voltage VDD is 3.0V, the second positive voltage (ground voltage) VSS is 0V, the negative voltage generated from the charge pump VENG is −1.0V, and R1=R3=1KΩ. Further, the characteristics of the first PMOS transistor MP1 and the second PMOS transistor MP2 are the same. Also, the characteristics of the first NMOS transistor MN1 and the second NMOS transistor MN2 are the same.

First, when the operational amplifier OP1 of the first current mirror unit 211 receives the positive reference voltage ref_p via its inverted input port, the positive reference voltage ref_p (=0.6V) is higher than ground voltage VSS (=0V) since the non-inverted input port of the operational amplifier OP1 is grounded (0.6V>0V). Hence, the operational amplifier OP1 outputs a signal having low level voltage to turn on the first PMOS transistor MP1 and the second PMOS transistor MP2. Meanwhile, since the input impedance of the operational amplifier OP1 approaches infinity, the voltage at the non-inverted input port equals the positive reference voltage ref_p (=0.6V), the voltage level at node n1 equals the positive reference voltage ref_p(=0.6V), and the first output current I1 equals 0.6 mA (0.6V/1KΩ). In that case, the operational amplifier OP1, the first and the second PMOS transistors MP1 and MP2, and the resistor R3 together form a current mirror circuit, and thus the second output current I2 and the first output current I1 are the same (I2=I1=0.6 mA).

Next, referring to FIG. 2C, the negative voltage VENG generated by the charge pump 13 often has an output ripple. Hence, for example, the negative voltage VENG with a value of −1.0V actually fluctuates between −0.95V and −1.05V, with a voltage variation |ΔV| of 0.05V. On the other hand, the first NMOS transistor MN1 (control unit 212a) of the second current mirror unit 212 receives the source negative voltage VENG via its source. Since the drain and the gate of the NMOS transistor MN1 are connected to each other, the voltage difference VGS between the gate and the source is kept stable due to the constant current I2(0.6 mA). Under the circumstance, the control signal C (with a voltage level Vn2 shown in FIG. 2C) generated at second node n2 has a voltage level ranges from −0.35V to −0.45V and varies according to the fluctuation of the source negative voltage VENG. From FIG. 2C, it is seen the voltage variation |ΔV| of the control signal C (Vn2) also equals 0.05V.

Note the second output current I2 is received by the first NMOS transistor MN1 through its drain, and the first and the second NMOS transistors MN1 and MN2 and the resistor R3 together form a current mirror circuit. Hence, the third output current I3 with a value of 0.6 mA is equal to the first and the second output current I1 and I2. Further, the source of the second NMOS transistor MN2 (switching unit 212b) and the source of the first NMOS transistor MN1 are both coupled to the same source negative voltage VENG, and the second NMOS transistor MN2 receives the control signal C via its gate. Thus, when the source negative voltage VENG with an output ripple fluctuates between −0.95V and −1.05V, the voltage level of the control signal C also fluctuates simultaneously between −0.35V and −0.45v, and the current passing through the second NMOS transistor MN2 is constant because the Vgs of the second NMOS transistor MN2 is constant.

For example, when the negative voltage VENG varies from −1.0V to −1.02V (voltage variation |ΔV|=0.02V), the voltage level of the control signal C correspondingly varies from −0.4V to −0.42V (voltage variation |ΔV|=0.02V). Under the circumstance, a third output current I3 passing through the second NMOS transistor MN2 remains constant at the value of 0.6 mA. On the contrary, when the source negative voltage VENG varies from −1.0V to −0.95V (voltage variation |ΔV|=0.05V), the voltage level of the control correspondingly varies from −0.4V to −0.35V (voltage variation |ΔV|=0.05V). Under the circumstance, the third output current I3 passing through the second NMOS transistor MN2 still remains constant at the value of 0.6 mA.

Hence, the third output current I3 is continually kept as 0.6 mA. A first output negative voltage ref_no1 drawn at the output node no1 equals −0.6V (−0.6 mA×1KΩ). Further, different levels of the negative voltage can be obtained by providing a tapped resistor. For example, in case the resistor R1 is tapped at its middle point, the level of the drawn negative voltage ref_no2 equals −0.3V.

To sum up, according to the invention, a stable negative voltage ref_no1 or different levels of stable negative voltage ref_no2 can be obtained when the voltage mirror circuit 21 receives a stable positive voltage ref_p. For example, in case the positive voltage ref_p=0.9V, the first output negative voltage ref_no1 (=−0.9V) is obtained, and different levels of the output negative voltage ref_no2 (such as −0.3V, −0.45V, and −0.6V) are also obtained by means of a multi-tap resistor. Also, the design parameters of the first and the second PMOS transistors, the first and the second NMOS transistors, and the resistors R1 and R3 can be arbitrary selected according to the actual demand. Though the first output negative voltage ref_no1 or ref_no2 may change when the aforesaid parameters are modified, it is still a stable negative voltage. Therefore, the major circuit in the voltage mirror circuit is also like a constant current source to provide constant current I3. This constant current I3 then flows through the R1 and generates the first output negative voltage ref_no1 at the first output node no1, and the value of the first output negative voltage ref_no1 is independent of the variation of negative voltage source VNEG. Of course, the resistor provided herein can be replaced by any electrical device which has resistance property, such as diode or transistor.

Besides, the first output negative voltage ref_no1 or ref_no2 of the voltage mirror circuit 21 is a weak signal and thus hard to drive a high power circuit. Hence, a negative voltage down converter 22 is additionally provided to aid the implement of the invention in a high power circuit, as shown in FIG. 2D.

Figure 2D:
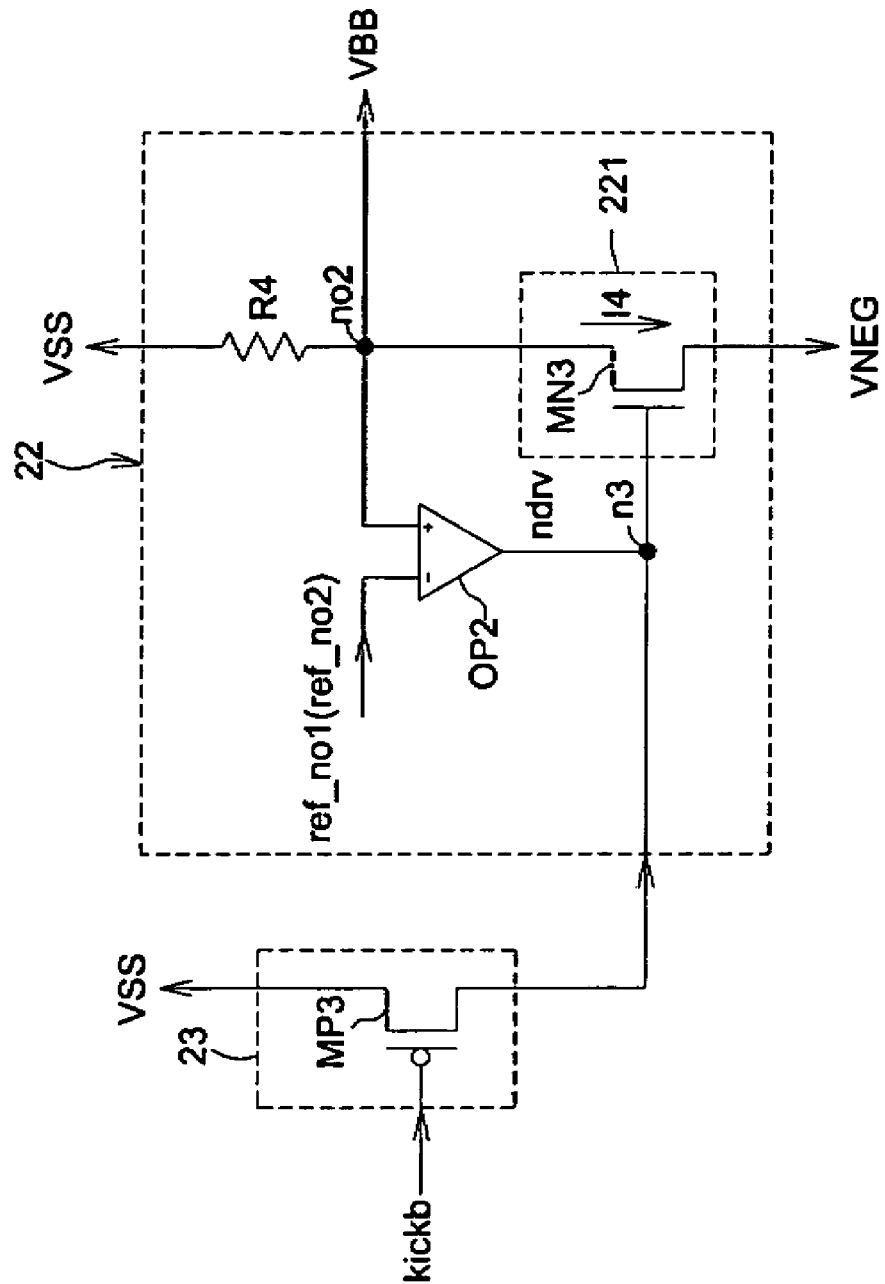
FIG. 2D shows a schematic diagram illustrating a negative voltage down converter and a kick unit according to the invention.

Referring to FIG. 2D, the negative voltage down converter 22 is a kind of a regulator. The negative voltage down converter receives the first output negative voltage ref_no1 (or ref_no2) and generates a second output negative voltage VBB through a second output node no2. Also, the negative voltage down converter 22 adjusts the second output negative voltage VBB according to the first output negative voltage ref_no1 (or ref_no2) and the second output negative voltage VBB.

The negative voltage down converter 22 includes, as one embodiment, the circuit architecture shown in FIG. 2D, and may be constructed by other circuit having similar functions. Referring to FIG. 2D, the negative voltage down converter 22 includes a resistor R4, an operational amplifier OP2, and a switching unit 221. In this embodiment, the switching unit 221 is a NMOS transistor MN3. The resistor R4 is connected between a second positive voltage source VSS and the second output node no2. The operational amplifier OP2 receives the first output negative voltage ref_no1 or ref_no2 output from the voltage mirror circuit 21 via its inverted input port, and its non-inverted input port is connected to the second output node no2. The gate of the NMOS transistor MN3 is connected to the output port of the operational amplifier OP2 at an input node n3. The drain of the NMOS transistor MN3 is connected to the second output node no2, and its source is connected to the source negative voltage VNEG generated by the charge pump 13.

The operations of the negative voltage down converter 22 is described below with reference to FIG. 2D. Assume R4=1KΩ, the source negative voltage VENG=1.0V (fluctuating between −0.95V and −1.05V due to the output ripple), and the second positive voltage source VSS=0V. As shown in FIG. 2D, the second output negative voltage VBB varies corresponding to the first output negative voltage ref_no1 generated by the voltage mirror circuit 21. In this embodiment, both of the second output negative voltage VBB and the first output negative voltage ref_no1 equal 0.6V, and thus a fourth output current I4 equals 0.6 mA.

When the source negative voltage VENG with output ripple generated from the charge pump 13 fluctuates between −0.95 and −1.05V, the operational amplifier OP2 will compare the first output negative voltage ref_no1 and the second output negative voltage VBB at the second output node no2. When the second output negative voltage VBB is decreased, such as varying from −0.6V to −0.61V, the first output negative voltage ref_no1 is higher than the second output negative voltage VBB. Hence, a second operational amplifier OP2 amplifies the difference between the first output negative voltage ref_no1 and the second output negative voltage VBB to generate an analog drive signal ndrv whose value depends on that difference so as to turn off the NMOS transistor MN3. Under the circumstance, the fourth output current I4 of the NMOS transistor MN3, which is formerly increased under the influence of the decreased source negative voltage VENG, is decreased and recovered to the constant values of 0.6 mA and then kept stable.

On the contrary, when the second output negative voltage VBB is increased, such as varying from −0.6V to −0.5V, the first output negative voltage ref_no1 is lower than the second output negative voltage VBB. Hence, the second operational amplifier OP2 amplifies the difference between the first output negative voltage ref_no1 and the second output negative voltage VBB to generate an analog drive signal ndrv whose value depends on that difference so as to turn on the NMOS transistor MN3. Under the circumstance, the fourth output current I4 of the NMOS transistor MN3, which is formerly decreased under the influence of the increased negative voltage VENG, is increased and recovered to the constant values of 0.6 mA and then kept stable. Therefore, the second output negative voltage VBB is continually stable and kept at −0.6V.

Hence, according to the invention, the negative voltage down converter 22 incorporated in the voltage mirror circuit 21 may generate a stable negative voltage VBB capable of driving a high power device, and it is also able to avoid an unstable output negative voltage of a conventional negative voltage generator. Wherein, in FIG. 2D, the fourth output current I4 and second output negative voltage VBB are given by the following equations:

$$I4 = \frac{V_{ref\_no1(ref\_no2)}}{R4} \quad (1.5)$$

$$VBB = I4 \times R4 = \frac{V_{ref\_no1(ref\_no2)}}{R4} \times R4 = V_{ref\_no1(ref\_no2)} \quad (1.6)$$

During the transmission of the negative voltage in a negative voltage down converter 22, the signals transmitted between the inverted input port and the non-inverted input port of the operational amplifier OP2 are typically delayed for a few nanoseconds. To certain systems, such delay may result in a design defect. Hence, according to the invention, a kick unit 23 is additionally provided to solve the problem.

As shown in FIG. 2D, the kick unit 23 is connected to the second positive voltage source VSS and is used to turn on the NMOS transistor MN3 of the negative voltage down converter 22 according to a trigger signal kickb, so that the level of the second output negative voltage VBB is adjusted. The trigger signal kickb is generated at a pre-set time point determined according to system demand. The kick unit 23 includes, as one embodiment, the circuit architecture shown in 2D, and other circuit having similar functions may also be used. Referring to FIG. 2D, the kick unit 23 includes a PMOS transistor MP3, the PMOS transistor MP3 receives the trigger signal kickb via its gate, the source of the PMOS transistor MP3 is connected to the second positive voltage source VSS, and the drain of the PMOS transistor MP3 is connected to the input node n3. For example, when the signal transmission of the operational amplifier OP2 is delayed to result in a considerable decrease of the second output negative voltage VBB, the trigger signal kickb will turn on the PMOS transistor MP3 and simultaneously increase the gate bias of the NMOS transistor MN3 to a level identical to that of the second positive voltage source VSS (ground level). Hence, the NMOS transistor MN3 is turned on and the formerly decreased fourth output current I4 is increased and recovered to the pre-set value. The use of the kick unit 23 may effectively overcome the signal transmission delay of the operational amplifier OP2 to avoid an unstable second output negative voltage VBB. Certainly, the kick unit 23 may trigger the NMOS transistor MN3 of the negative voltage down converter 22 for other reasons. For example, the kick unit 23 may be used to stabilize the second output negative voltage VBB when the negative voltage VENG of the charge pump 13 suffers a considerable consumption.

Figure 3:
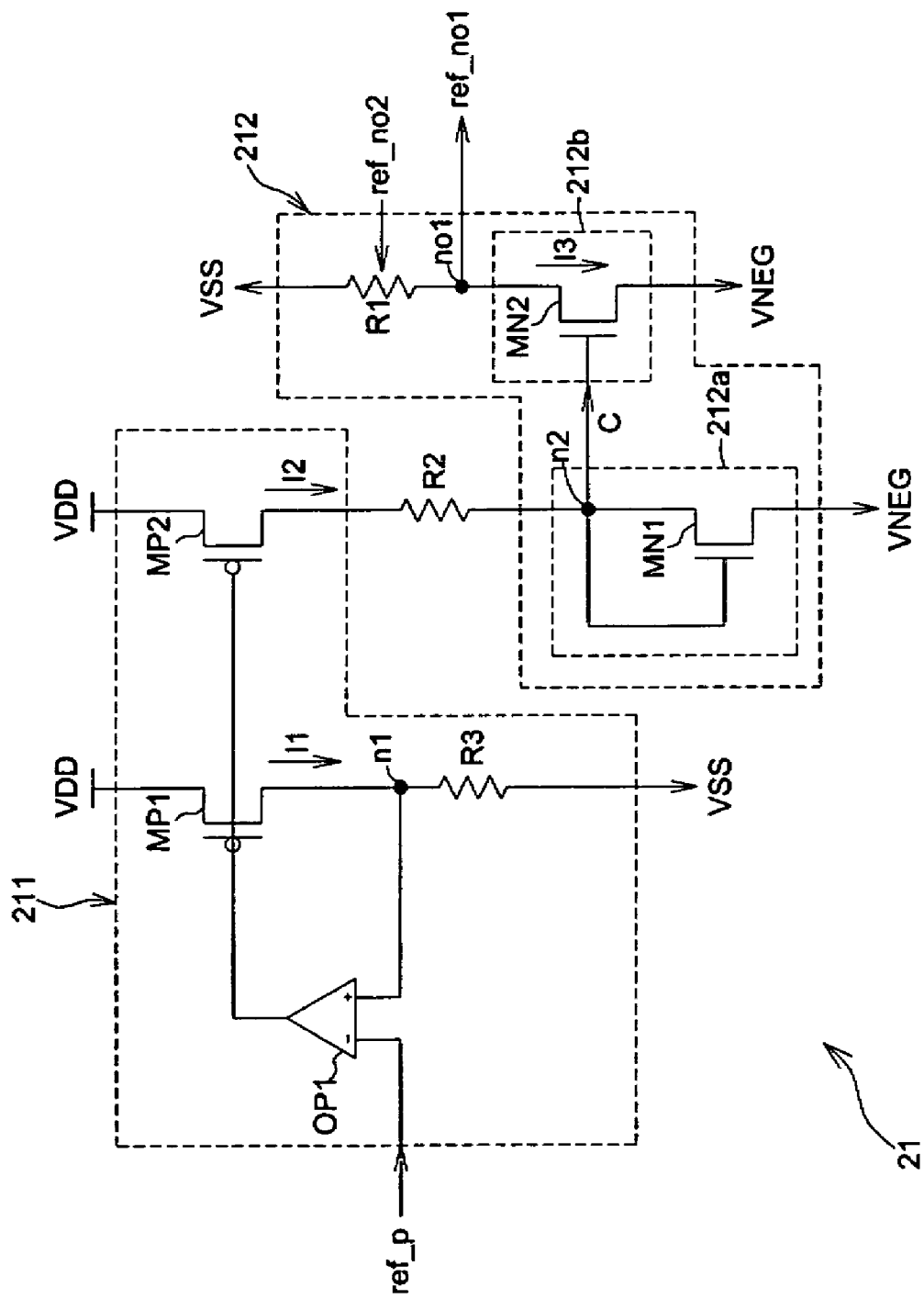
FIG. 3 shows a schematic diagram illustrating a negative voltage generator according to another embodiment of the invention.

Further, a resistor R2 may be provided between the control unit 212a and the second PMOS transistor MP2 to improve the current matching for the voltage mirror circuit 21, as shown in FIG. 3. In that case, the second output current I2 is received by the control unit 212a through the resistor R2 to eliminate the path mismatching between the first output current I1 and the second output current I2.

Figure 4A:
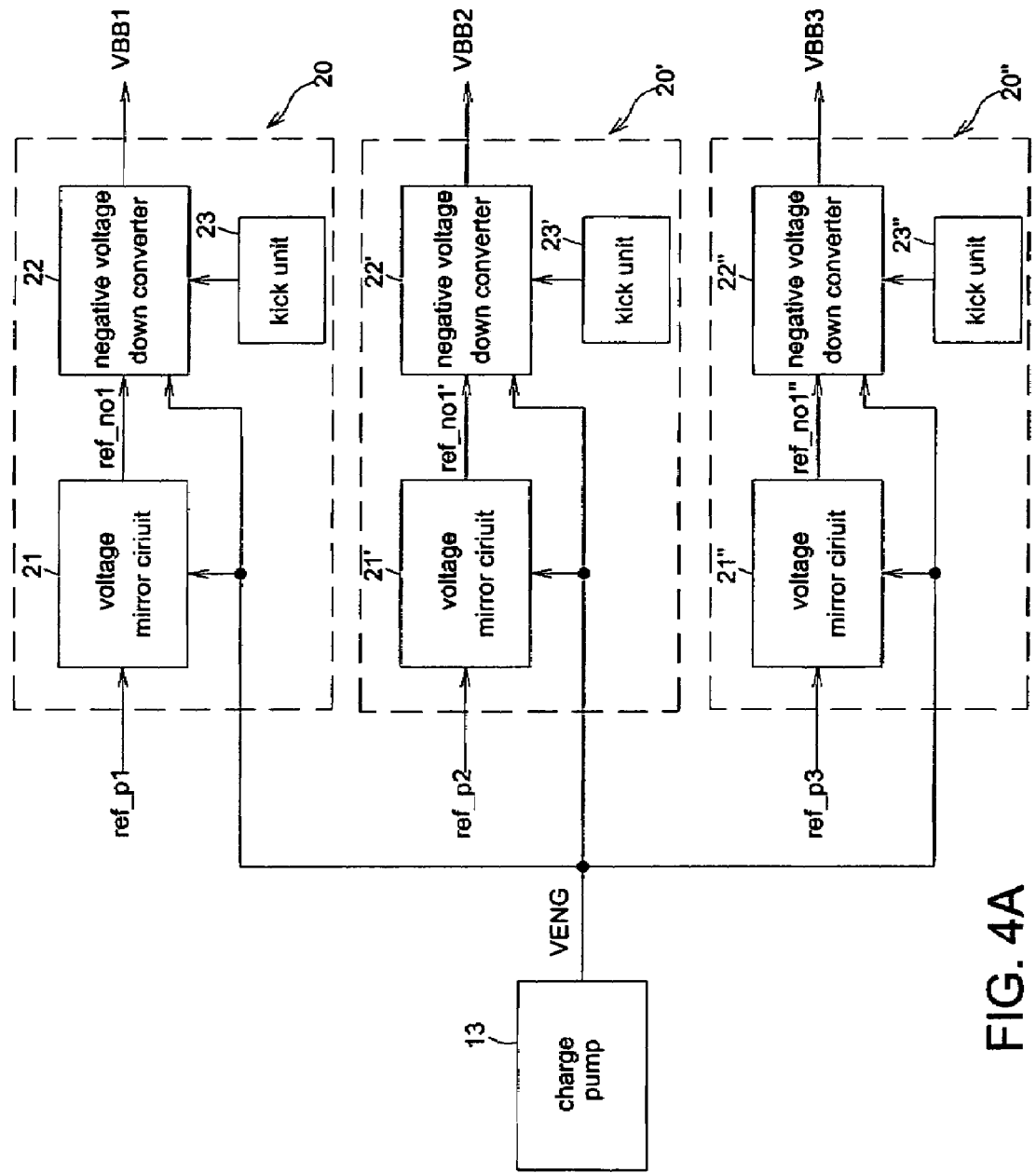
FIG. 4A shows a schematic diagram illustrating the generation of three different levels of negative voltage according to an embodiment of the invention.
Figure 4B:
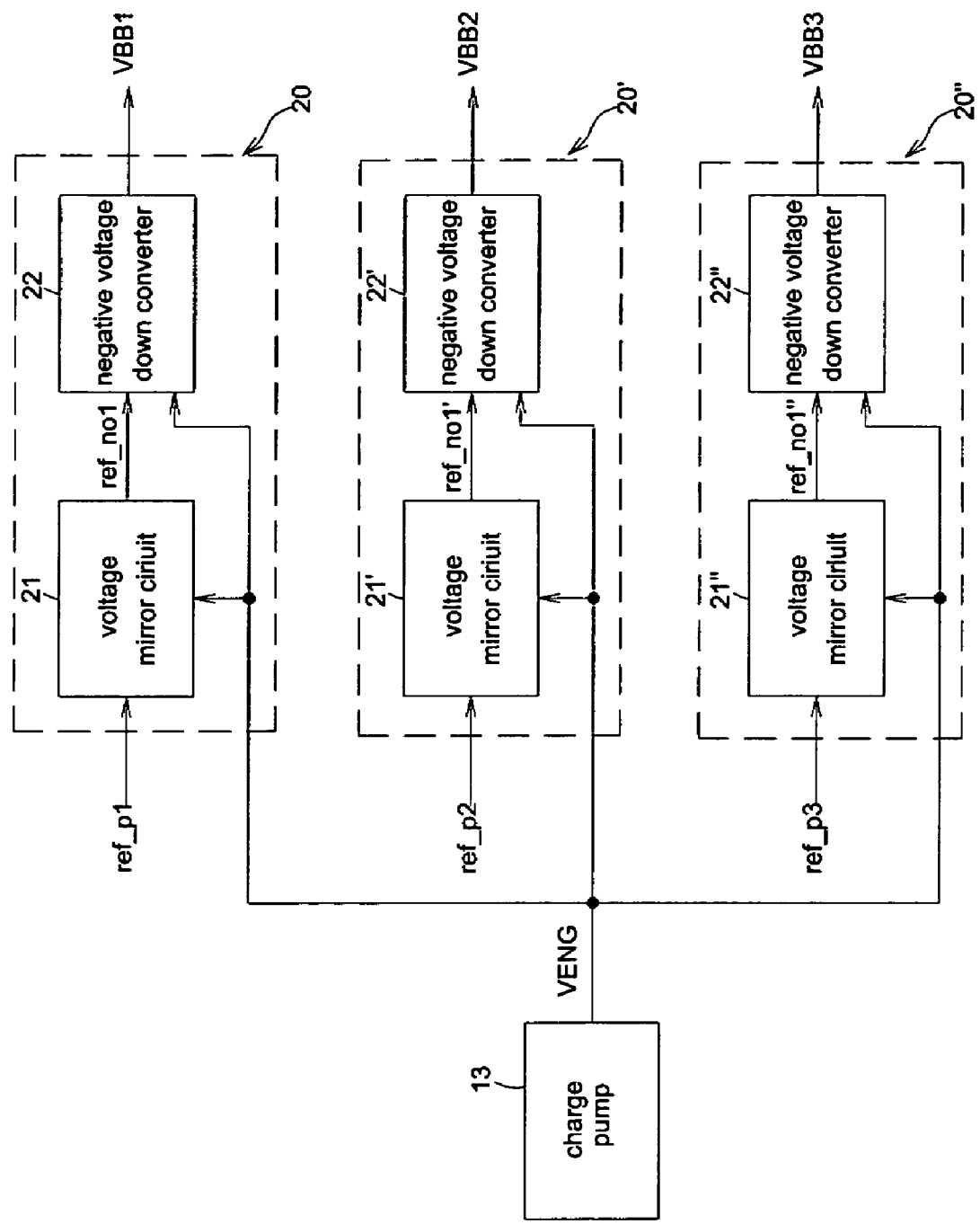
FIG. 4B shows a schematic diagram illustrating the generation of three different levels of negative voltage according to another embodiment of the invention.

Through the design of the invention, the output negative voltage of the negative voltage generator 20 is stable and not influenced by the charge pump 13. Thus, the disadvantages of the conventional design can be overcome, and circuit layout areas and fabrication costs are reduced. Further, compared with the conventional design where multiple charge pumps are needed to generate distinct values of negative voltage, only one charge pump 13 is needed to generate multiple stable values of the negative voltage during the operation of the negative voltage generator 20 according to the invention. For example, as shown in FIG. 4A, the three negative voltage generator 20, 20' and 20" all receive the source negative voltage VENG of the same charge pump 13 to generate three different levels of the second output negative voltage VBB1, VBB2 and VBB3. Certainly, as shown in FIG. 4B, in practical use the three kick units 23, 23' and 23" may be omitted to further reduce the layout areas and fabrication costs of the circuit.

Figure 5A:
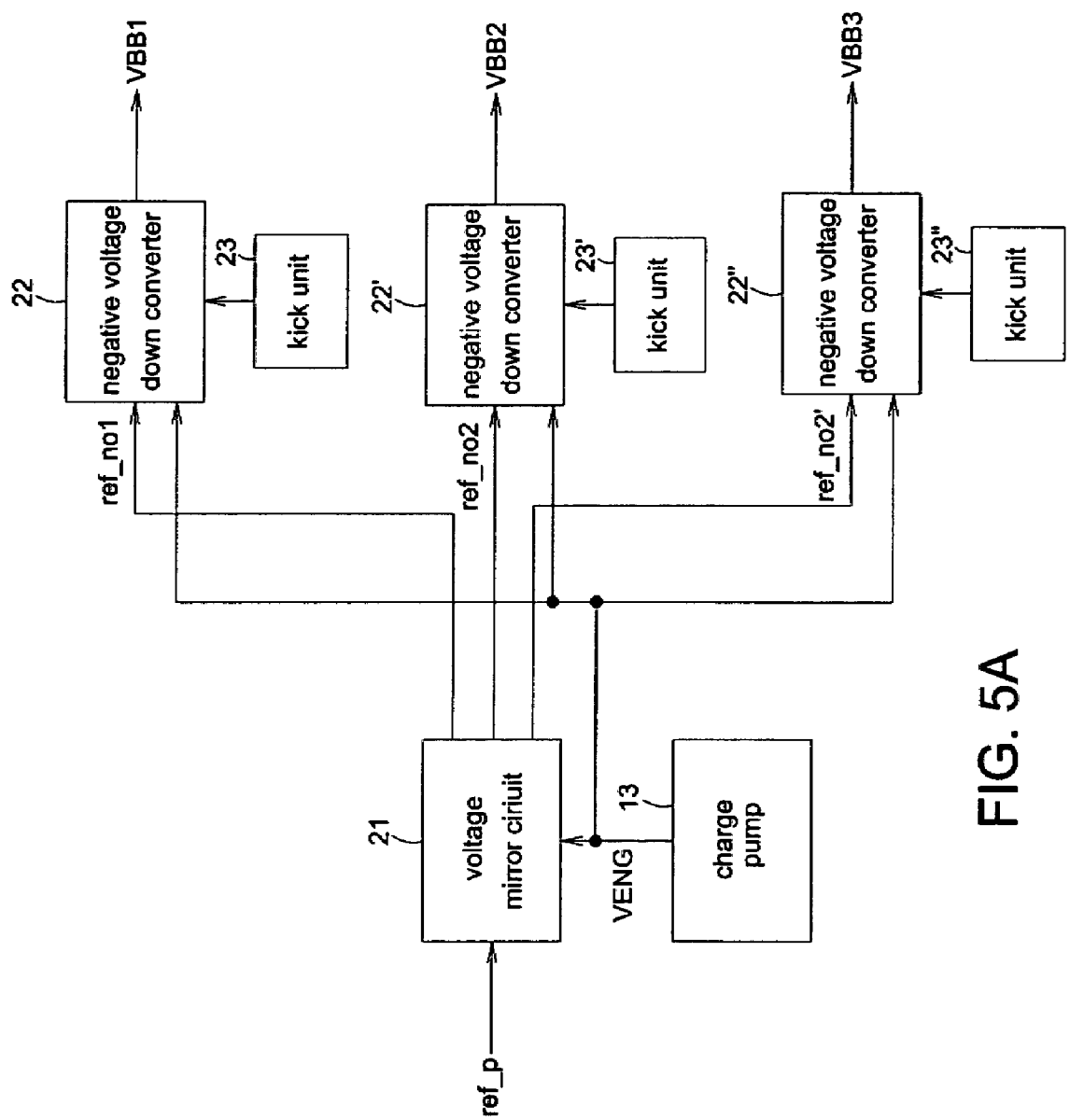
FIG. 5A shows a schematic diagram illustrating the generation of three different levels of negative voltage according to another embodiment of the invention.
Figure 5B:
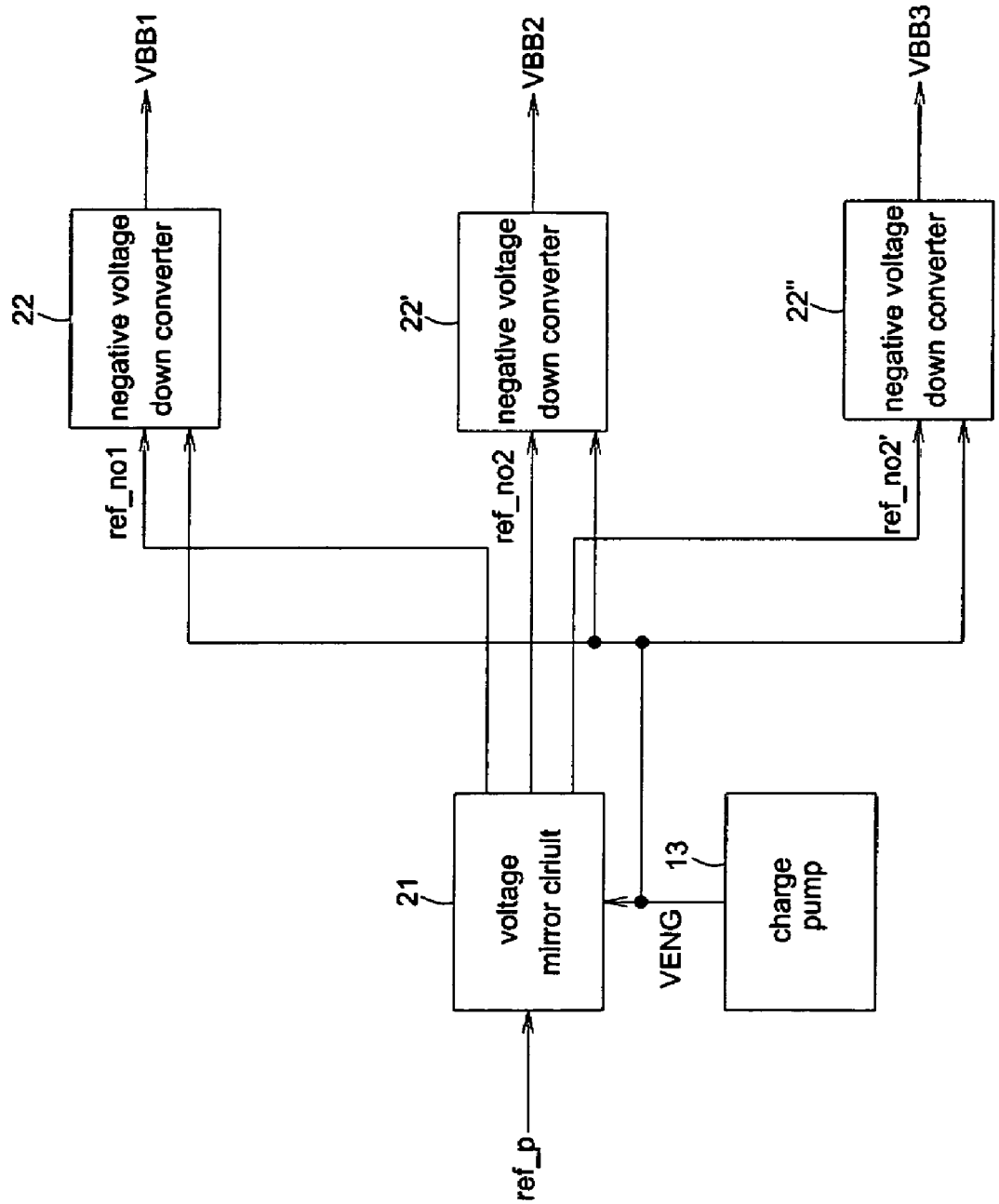
FIG. 5B shows a schematic diagram illustrating the generation of three different levels of negative voltage according to another embodiment of the invention.

Also, during the generation of different levels of the second output negative voltage VBB, the negative voltage VENG of the charge pump 13 may be received by a single voltage mirror circuit 21 to further reduce the layout areas and fabrication costs, as shown in FIG. 5A. Then, the voltage mirror circuit 21 generates multiple levels of the first output negative voltage, such as three levels of the first output negative voltage ref_no1, ref_no2 and ref_no2', and it may further cooperate with three negative voltage down converters 22, 22' and 22" and three kick units 23, 23' and 23" to generate three levels of the second output negative voltage VBB1, VBB2, and VBB3. Certainly, as shown in FIG. 5B, the three kick units 23, 23' and 23" may be omitted to further reduce the layout areas and fabrication costs.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A negative voltage generator, comprising:
   a current mirror unit for receiving a first positive voltage from a first positive voltage source and a second positive voltage from a second positive voltage source and determining how to generate a first output current and a second output current according to a received positive reference voltage and the second positive voltage, wherein the values of the first output current and the second output current are proportional;
   a control unit for receiving the second output current and generating a control signal whose value depends on the voltage variation of a negative voltage generated by a negative voltage source;
   a first resistor connected between the second positive voltage source and a first output node; and
   a switching unit connected between the first output node and the negative voltage source, the on/off state of the switching unit being determined according to the control signal to keep the current passing through the switching unit constant and to generate a first output negative voltage having a constant level through the first output node.

2. The negative voltage generator as claimed in claim 1, wherein the current mirror unit comprises:
   an operational amplifier for receiving the positive reference voltage via its inverted input port;
   a first transistor, the gate of the first transistor being connected to the output port of the operational amplifier, the source of the first transistor being connected to the first positive voltage source, and the drain of the first transistor being connected to the non-inverted input port of the operational amplifier, wherein a first node is formed by the junction of the drain of the first transistor and the non-inverted input port of the operational amplifier;
   a third resistor connected between the first node and the second positive voltage source; and
   a second transistor, the gate of the second transistor being connected to the output port of the operational amplifier, the source of the second transistor being connected to the first positive voltage source, and the drain of the second transistor being used to generate the second output current.

3. The negative voltage generator as claimed in claim 1, further comprising a negative voltage down converter for receiving the first output negative voltage, generating a second output negative voltage through a second output node, and adjusting the second output negative voltage according to the first output negative voltage.

4. The negative voltage generator as claimed in claim 3, wherein the negative voltage down converter comprising:
   a resistor connected between the second positive voltage source and the second output node;

an operational amplifier for receiving the first output negative voltage via its inverted input port, and its non-inverted input port being connected to the second output node; and a transistor, the gate of the transistor being connected to the output port of the operational amplifier with the junction forming an input node, the drain of the transistor being connected to the second output node, and the source of the transistor being connected to the negative voltage source.

5. The negative voltage generator as claimed in claim 3, further comprising a kick unit connected to the second positive voltage source to drive the negative voltage down converter according to a trigger signal so as to adjust the level of the second output negative voltage.

6. The negative voltage generator as claimed in claim 1, wherein the control unit comprises a first transistor, the drain and the gate of the first transistor being connected to each other with the junction forming a second node, the source of the first transistor being connected to the negative voltage source, the drain of the first transistor receiving the second output current, and the first transistor generating the control signal through the second node.

7. The negative voltage generator as claimed in claim 6, wherein the switching unit comprises a second transistor, the gate of the second transistor being connected to the second node, the drain of the second transistor being connected to the first output node, and the source of the second transistor being connected to the negative voltage source.

8. The negative voltage generator as claimed in claim 1, wherein the negative voltage source is generated by a charge pump.

9. The negative voltage generator as claimed in claim 1, wherein the positive reference voltage is a stable positive voltage.

10. The negative voltage generator as claimed in claim 1, wherein the control unit receives the second output current through a second resistor.

11. A negative voltage generator, comprising:

a current mirror unit connected to a first voltage source and to a second voltage source, the current mirror unit generating a first output current and a second output current according to a predetermined positive reference voltage and the voltage level provided from the second voltage source, wherein the values of the first output current and the second output current are proportional;

a control unit for receiving the second output current and generating a control signal whose value depends on the voltage variation of a predetermined negative reference voltage; and a switching unit connected between a first output node and the control unit, the on/off state of the switching unit being determined according to the control signal to keep the current passing through the switching unit substantially constant and to generate a first output negative voltage having a substantially constant level at the first output node.

12. The negative voltage generator as claimed in claim 11, wherein the current mirror unit comprises:

an operational amplifier for receiving the predetermined positive reference voltage via its inverted input port;

a first transistor, the gate of the first transistor being connected to the output port of the operational amplifier, the source of the first transistor being connected to the first voltage source, and the drain of the first transistor being connected to the non-inverted input port of the operational amplifier at a first node;

a third resistor connected between the first node and the second voltage source; and a second transistor, the gate of the second transistor being connected to the output port of the operational amplifier, the source of the second transistor being connected to the first voltage source, and the second output current flowing through the drain of the second transistor.

13. The negative voltage generator as claimed in claim 11, further comprising a first resistor connected between the second voltage source and the first output node.

14. The negative voltage generator as claimed in claim 11, further comprising a negative voltage down converter for generating a second output negative voltage at a second output node according to the first output negative voltage, wherein the driving capacity of the second output negative voltage is higher than that of the first output negative voltage.

15. The negative voltage generator as claimed in claim 14, wherein the negative voltage down converter comprising:

a resistor connected between the second voltage source and the second output node;

an operational amplifier for receiving the first output negative voltage via its inverted input port, and its non-inverted input port being connected to the second output node; and a transistor, the gate of the transistor being connected to the output port of the operational amplifier, the drain of the transistor being connected to the second output node, and the source of the transistor being connected to the predetermined negative reference voltage.

16. The negative voltage generator as claimed in claim 14, further comprising a kick unit connected to the second voltage source to drive the negative voltage down converter according to a trigger signal so as to adjust the level of the second output negative voltage.

17. The negative voltage generator as claimed in claim 11, wherein the control unit comprises a first transistor, the drain and the gate of the first transistor being connected to a second node, the source of the first transistor being connected to the predetermined negative reference voltage, the drain of the first transistor receiving the second output current, and the control unit generating the control signal through the second node.

18. The negative voltage generator as claimed in claim 17, wherein the switching unit comprises a second transistor, the gate of the second transistor being connected to the second node, the drain of the second transistor being connected to the first output node, and the source of the second transistor being connected to the predetermined negative reference voltage.

19. The negative voltage generator as claimed in claim 11, wherein the predetermined negative reference voltage is generated by a charge pump.

20. The negative voltage generator as claimed in claim 11, wherein the control unit receives the second output current through a resistor.

21. A negative voltage generator, comprising:

a resistance device disposed between a voltage source and a predetermined negative reference voltage;

a constant current source generating a constant current flowing through the resistance device, wherein a first output negative voltage is generated at one end of the resistance device and the level of the first output negative voltage is independent of the variation of the predetermined negative reference voltage;

a first negative voltage down converter receiving the first output negative voltage and generating a second output negative voltage at a second output node, wherein the magnitude of the second output negative voltage is higher than that of the first output negative voltage; and a kick unit connected to the voltage source to drive the first negative voltage down converter according to a trigger signal so as to adjust the level of the second output negative voltage.

22. The negative voltage generator as claimed in claim 21, wherein a third output negative voltage is generated from the resistance device and the voltage level of the third output negative voltage is independent of the variation of the predetermined negative reference voltage.

23. The negative voltage generator as claimed in claim 22 further comprising a second negative voltage down converter receiving the third output negative voltage and generating a fourth output negative voltage correspondingly, wherein the magnitude of the fourth output negative voltage is higher than that of the third output negative voltage.

24. The negative voltage generator as claimed in claim 23, the second negative voltage down converters is connected to a kick unit which drives the second negative voltage down converter according to a trigger signal so as to adjust the level of the fourth output negative voltage.

* * * * *